United States Patent [19]
Pinet

[11] 3,930,801
[45] Jan. 6, 1976

[54] APPARATUS FOR LIQUID EXTRACTING OF PRODUCTS WHICH ARE PART OF SOLID MATERIALS

[75] Inventor: Charles Henri Jules Pinet, Hoegaarden, Belgium

[73] Assignee: "Raffinerie tirlemontoise", Brussels, Belgium

[22] Filed: Mar. 20, 1974

[21] Appl. No.: 453,121

[30] Foreign Application Priority Data
Mar. 30, 1973 Belgium .................. 797596

[52] U.S. Cl. ............. 23/269; 23/270 R; 209/362
[51] Int. Cl.² ................................. B01D 11/02
[58] Field of Search ........... 210/189, 150, 372, 404, 210/381; 23/269 R, 270 R

[56] References Cited
UNITED STATES PATENTS

| | | | |
|---|---|---|---|
| 2,637,666 | 5/1953 | Langen | 23/270 X |
| 2,645,589 | 7/1953 | Langen | 23/270 |
| 3,297,410 | 1/1967 | Lisle | 23/269 |
| 3,400,826 | 9/1968 | Hammer | 210/381 X |
| 3,595,695 | 7/1971 | Langen et al. | 23/270 |
| 3,809,538 | 5/1974 | Duchateau | 23/269 |

*Primary Examiner*—Theodore A. Granger
*Attorney, Agent, or Firm*—Sughrue, Rothwell, Mion & Zinn

[57] ABSTRACT

An extracting apparatus comprising at least one screw conveyor divided into cells, in which to form the solid-material supply compartment, the drum is extended beyond the conveyor last winding without substantial diameter differential by a circumferential perforated casing which is pervious to the liquid and which extends up to a terminal diametral wall provided with a central supply opening for the solid materials; said supply compartment comprises as many liquid-pervious axial elements for raising the solid materials as there are cell series in the drum; to each one of said axial raising elements is associated a slanting channel for conveying the solid materials from the supply compartment to the last cell in each cell series.

4 Claims, 5 Drawing Figures

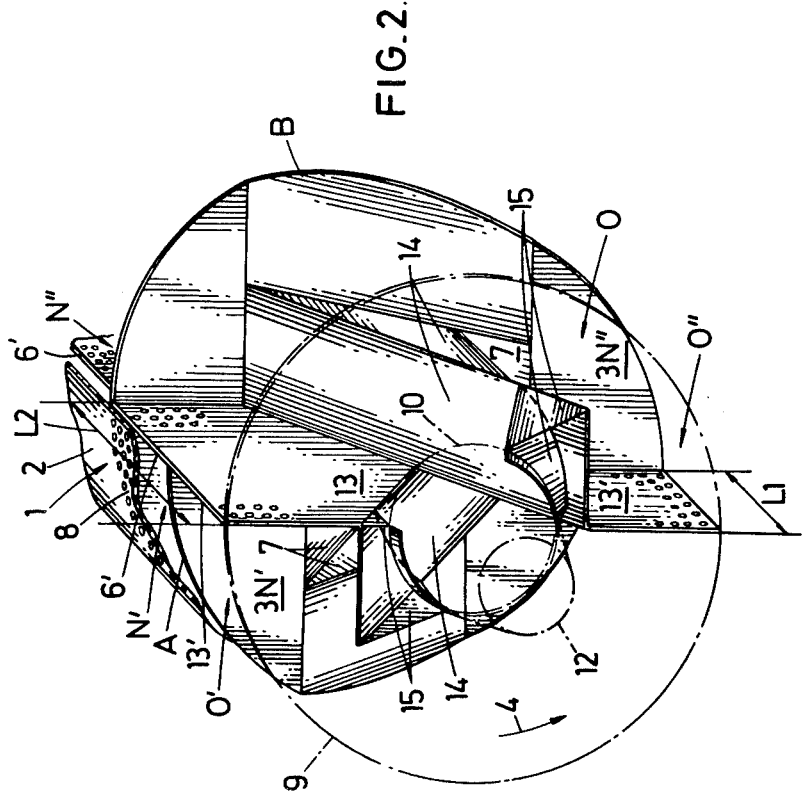

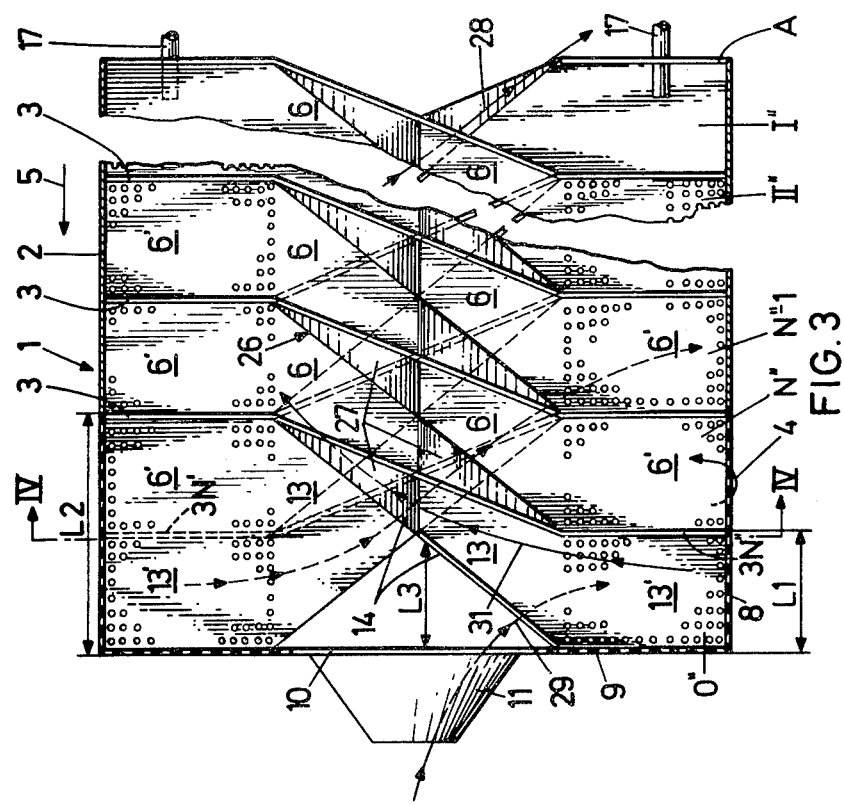

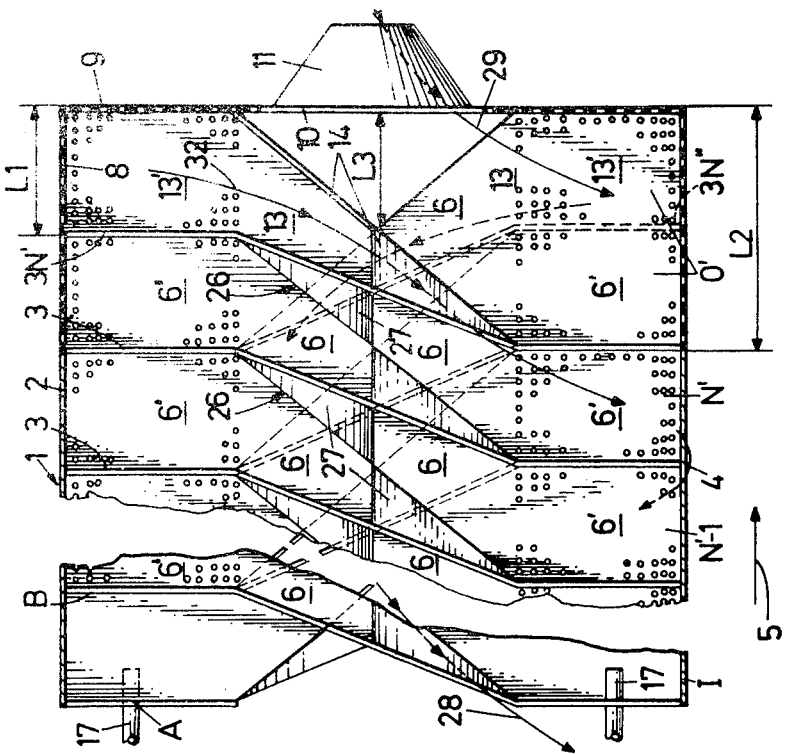
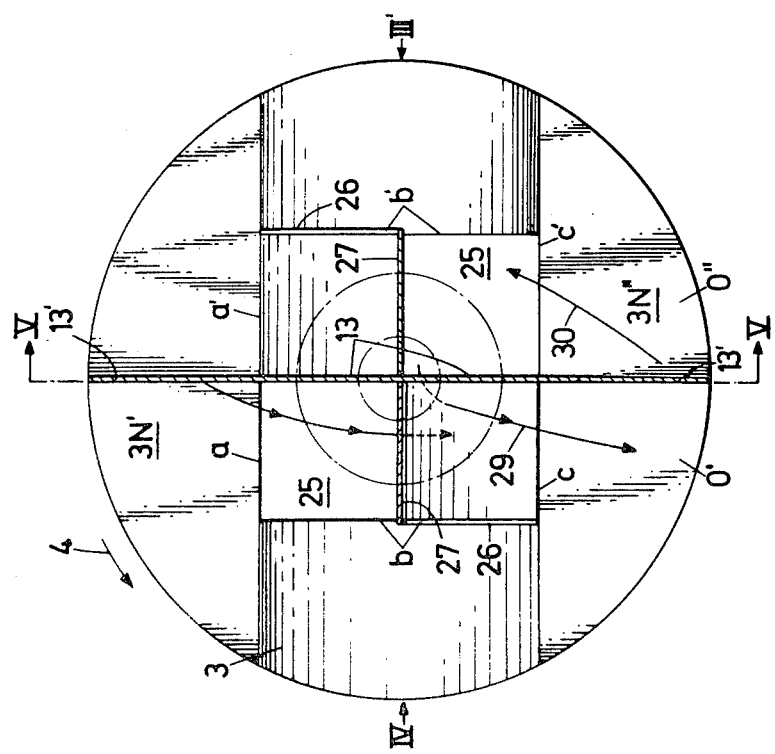

APPARATUS FOR LIQUID EXTRACTING OF PRODUCTS WHICH ARE PART OF SOLID MATERIALS

This invention relates to an apparatus for liquid-extracting of products which are part of solid materials, by counter-flow feeding of the liquid and the solid materials, which comprises a revolving drum housing means, a pair of impervious to liquid wall means being mounted in said revolving drum housing means and being integral therewith, which solid wall means define windings of two staggered helical screws, said staggered helical screws defining two screw conveyors for conveying liquid into two separate flows along one axial direction of the drum housing means, there being a first winding and a last winding for each of said helical screws, which define respectively a screw conveyor inlet end and an outlet end for the liquid, central axial partition walls extending between the succeeding windings of the screws, and being integral with said drum housing means to separate said windings into half portions of windings and to manage two series of cells for solids, each cell being defined between a partition wall, said drum housing means and succeeding half portions of windings, said axial partition walls being previous to the liquid at the peripheral portions thereof which extend from said drum housing means up to a distance from the drum housing means axis so that for each partition wall the peripheral portions comprise a raising portion for the solids of one cell during revolution of the drum housing means, channel means for the interconnection of adjacent cells in each series of cells through openings being present in said half windings adjacent the central part of said partition walls, to convey solids from said solids raising portions along the central part of the axial partition walls from cell to cell in each series of cells in counteraxial direction to the liquid flow direction, and means for feeding liquid at the inlet side of each of said screw conveyors.

The invention has for object an improvement in extracting apparatus of this kind and it relates more specifically to the supplying of the apparatus with solid materials.

It is known notably in the case of the sugar extracting from sugar-beet cossettes, to bring the solids, i.e. cossettes to the temperature suitable for extracting by mixing before the entry in the apparatus, solids with an amount of heating liquid. Said liquid has to be separated from the solids before said solids enter the terminal compartment for liquid and which corresponds to the first cells for the solids, of the one conveyor of the apparatus and to be discharged from the drum. The extracting liquid fed in counter-flow and present in the last conveyor compartment has also to be discharged from the drum.

In a known extracting apparatus as disclosed notably in U.S. Pat. No. 2,569,199, the supply compartment has to provide a large enough liquid filtering and discharging area, a diameter substantially larger then the drum diameter; this causes a lack of balance in the apparatus geometry and consequently difficulties in the mounting and the driving of such apparatus as well as a limitation in the apparatus nominal capacity.

The invention has for object to obviate the above drawbacks and to improve the separation of the solid materials and the liquid in the supply compartment. For this purpose according to the invention, to form the solid-material supply compartment, the drum is extended beyond the conveyor last winding without substantial diameter differential by a circumferential perforated casing which is pervious to the liquid and which extends up to a terminal diametral wall provided with a central supply opening for the solid materials; said supply compartment comprises as many liquid-pervious axial elements for raising the solid materials as there are cell series in the drum; to each one of said axial raising elements is associated a slanting channel for conveying the solid materials from the supply compartment to the first cell for solids in each cells series.

Particularly according to the invention, the terminal diametral wall is located when considering the zone where lies the solid material raising element of the first cell for solids from each cells series, at a distance from the last winding of the screw conveyor which is in the range of the width of a conveyor cell, while on that side diametrically opposite the side where lies the solid material raising element of the first cell for solids in each cell series, the supply compartment has a capacity continuity between the terminal wall and the corresponding winding portion of the conveyor first cell for solids. There results therefrom that while the supply compartment only extends the drum by one cell width, the width of the supply compartment in that area where falls the inlet mixture of solid materials and liquid, corresponds approximately to two conveyor cell widths, which thus gives a large filtering area. Consequently the materials raised by the raising portions of the supply compartment are adequately drained, which even with the reduced width of the compartment in the raising zone, prevents the danger of the liquid being taken along with the solid materials.

In a preferred embodiment of the invention, that drum casing portion which is pervious to the liquid, forms a cylinder which extends from the terminal diametral wall up to the winding before one of each screw, in that zone thereof which contains the raising element of the first for the solids cell, the circumferential wall of the drum which is impervious to the liquid ending by the boundary of the cylindrical portion pervious to the liquid. This arrangement has the advantageous result that the liquid in the last conveyor compartment for liquid is discharged from the drum without entering the supply compartment.

Other details and features of the invention will stand out from the description given below by way of non limitative example and with reference to the accompanying drawings, in which:

FIG. 1 is a diagrammatic perspective view with parts broken away of an apparatus for liquid-extracting of solids with double screw conveyor as described in U.S. Pat. No. 2,569,199, in which the teachings of the invention have been embodied.

FIG. 2 is an end perspective view with parts broken away of the solids supply side of the apparatus shown in FIG. 1, the drum terminal wall being considered as transparent.

FIG. 3 is a schematic cross-section of the apparatus of FIG. 1, the baffle means and header not being shown, the apparatus being considered from the opposite side in ralation to the drawing sheet to that side considered on FIG. 1;

FIG. 4 is a section along lines IV—IV of FIG. 3;

FIG. 5 is a cross-section along lines V—V of FIG. 4;

FIGS. 3 and 5 show consequently cross-sections of the apparatus of FIG. 1, at the same time of rotation thereof, FIG. 3 showing the apparatus seen on the side of arrow III and FIG. 4 showing the apparatus seen on the side of arrow IV when considering FIG. 3;

Figure 1:
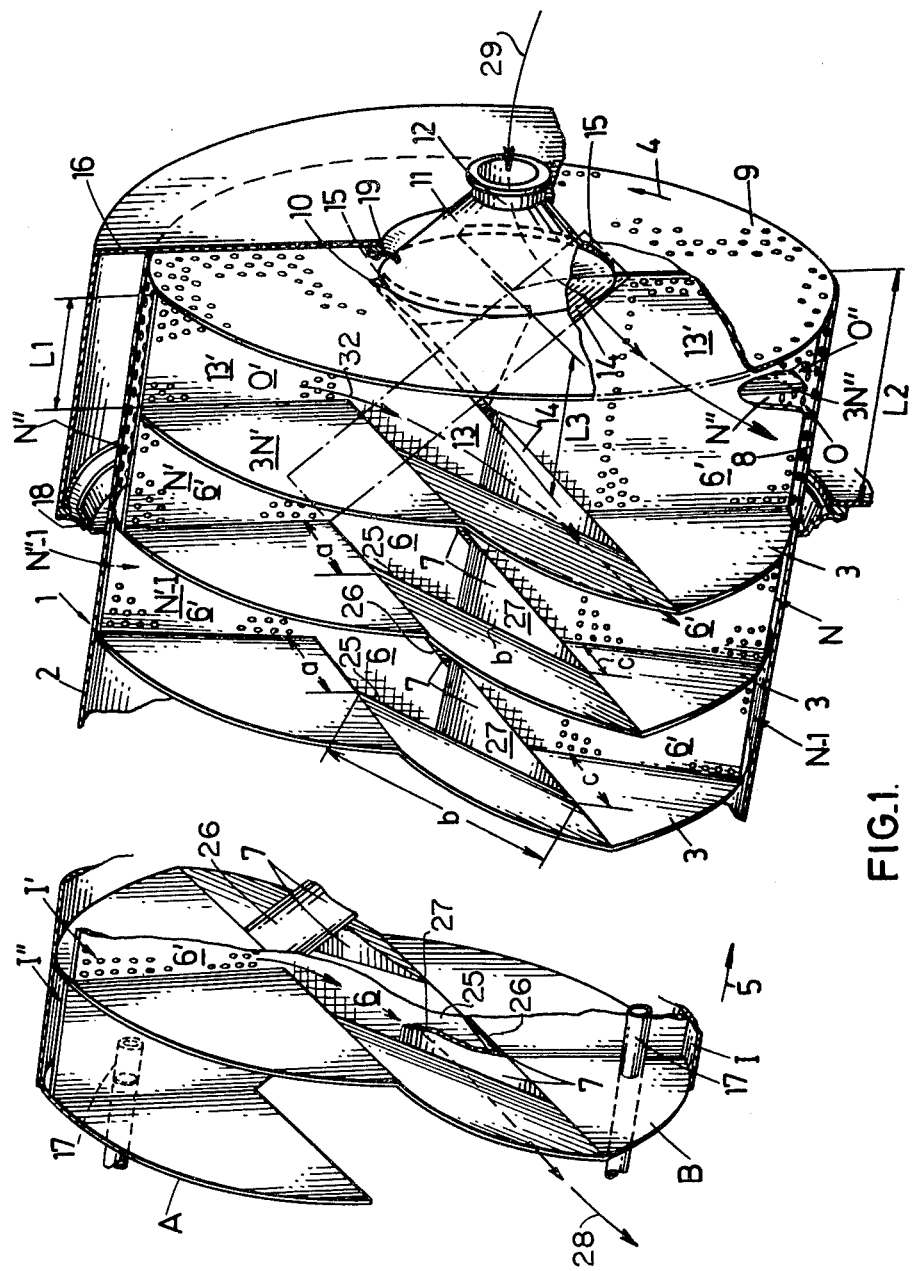

The conveyor shown in the figures comprises a rotating drum 1 which is rotated in the direction shown by arrow 4 by usual driving means not shown. The drum circumferential housing 2 is impervious to the liquid. Inside the drum are arranged solid windings 3 of two staggered helical screws A, B which are made fast at the circumference thereof to the drum housing 2 and which define together with the drum 1, two screw conveyors overlapping one another; the succeeding windings 3 define when considering the drum lower part, liquid compartments comprised of the adjacent windings 3 which pertain alternately to screw A and screw B. In FIG. 1 said compartments bear references I to N.

Each one of both screw conveyors is supplied at the inlet thereof, with extracting liquid, for example through a pipe 17, the liquid consequently being conveyed along the direction of arrow 5 as two separate streams and advances by each drum revolution over one conveyor pitch step, which corresponds to the width of two compartments I . . . N.

Between the succeeding windings 3 of the conveyors and in the center of the drum extend axial walls 6 which divide the drum into two series of cells for the solids arranged back to back and duplicating the compartments I . . . N. The cells bear respectively the references I' to N' and I'' to N''. The central area of the windings 3 is hollow as usual in screw conveyors, so that on each side of the central part of the axial walls 6 there is for each winding 3 an opening 25 extending between the central part of the axial wall 6 and the winding 3; on FIG. 1 the edges of the openings 25 bear references $a$, $b$, $c$. Through said openings 25, adjacent cells of one series are interconnected. To the edges $a$, $c$ of adjacent openings 25, there is attached a slanting wall 27 whereas to edges $b$ and facing edge of said slanting wall 27 there are attached closing walls 26 in such a manner to form central channels 7 slanting along the direction opposite the liquid movement in the conveyors; consequently the solid material portions raised by each drum revolution by means of that axial wall portion 6' located on the drum casing side, fall back along the central part of the axial wall and of channel 7, to the drum bottom in the adjacent cell of the same series. Those parts of the axial walls 6' located on the side of the casing 2 and which are used to raise the solid materials are pervious to the liquid; actually said parts are comprised of perforated sheets to let the liquid after each contacting with a solid material portion, pass from a cell of the one series to a cell of the other series and thus to advance all along the drum with a speed twice as fast as the speed of the solid materials. In the description hereinbelow the axial parts 6' pervious to the liquid will be called raising screens.

It must be understood that the extracting apparatus has been described without giving those construction details thereof which do not contribute to the understanding of this invention; particularly, it is well known that to the raising sheets 6' are associated perforated side sheets which increase the liquid filtering area by the raising of solid material portions and form together with the raising screens 6' so-called baskets.

It is necessary for understanding the following part of the specification, to point out that the axial walls 6 divide each of the windings 3 of the screw conveyors A, B into two half portions of windings; for the last winding of each screw conveyor, the terminal half portion bears the reference numeral 3N' and 3N''. It is further necessary to point out that because of the opposite direction of movement of solids, the last compartment N for the liquid corresponds to the first cell N', N'' for the solids of each series of cell.

According to the invention, the following construction has been provided for the supply solids and the liquid discharge: the drum 1 is axially extended beyond the end of the last winding 3 of each screw A, B, whose terminal half portions are 3N' and 3N'' by a circular housing portion 8 which is pervious to the liquid, said circular housing portion 8 having substantially the same diameter as the drum 2, up to a terminal diametral wall 9.

The terminal wall 9 has a central opening forming an inlet for the solids said opening being provided outwardly with a cone 11 converging towards a supply tube 12 with a smaller diameter than the opening 10. The terminal wall is preferably pervious to the liquid over some of the width thereof from the circumference thereof.

The spacing between the terminal wall 9 and the end of the last winding 3 of each screw A, B is about equal to the spacing between two adjacent windings 3 of the conveyors.

The terminal wall 9, the screws terminal windings half portions and the circular housing portion 8 bound a head or supply compartment for solids O; said supply compartment which is divided into two supply cells O', O'' by an axial wall arrangement 13 similar to the axial wall arrangements 6. This means that the axial wall 13 comprises a central part impervious to liquid and two peripheral parts 13 ' which are pervious to the liquid, and serve as portions for the solids. To the central part of the axial wall 13 and on either side thereof is associated a channel 14 similar to the channels 7, which each connects one cell O', O'' to the first cell for solids N', N'', through the openings 25 in the final half portion 3N', 3N'' of the screws A, B. The supply cells O', O'' have a first portion with a width shown by the reference L1 in the zone containing the raising portion 13' for that supply cell, which correspond substantially to the width of one cell along the drum housing 2 and a second portion with a width shown by the reference L2 located in the diametrically opposite zone which correspond substantially to two cells widths.

Between the channels 14 of the supply compartment and the opening 10 in the terminal wall 9, there is no axial wall 13 and consequently there remains a free space L3 for the entry of the solid materials into the cells O', O''; between the top of each channel 14 and the portion thereof facing the opening in the terminal wall 9 has been provided a baffle element 15.

Preferably according to the invention, the circular housing portion 8 which is pervious to the liquid forms a revolution cylinder in such a way that it surrounds the first cell for solids N', N'' in each cell series in that zone thereof where the raising screen 6' is located.

Finally, a fixed liquid header 16 surrounds that drum portion which is pervious to the liquid, seals 18, 19 of flexible material bounding the header 16.

The operation of the above-described extracting apparatus will now be described as it is used for extracting sugar from beet cossettes.

The extracting liquid is fed alternately to the last cell I', I'' of each cells series for solids, i.e. the first compartment I for the liquid flows through the corresponding pipe 17 when said pipe passes through the drum bottom zone; out that side of the housing the cossettes portion after soaking in such pure juice in the last cell I, I' and after being raised by the raising screen 6' which they engage after one drum half-revolution, fall out of the drum housing 2 through the channel 7 associated to the opening 25 in the first half portion of winding 3 bounding each cell I,I''. An arrow 28 shows on FIGS 1, 3 and 5 the path of solids when they fall from the last cell for solids I, I'' out of the drum 1''.

On the drum opposite the cossettes enter continuously together with many times the volume thereof of heating juice, the supply compartment O, through the diverging cone 11 and the opening 10 in the drum terminal wall 9. Said cossettes are distributed as shown by arrow 29 according to the momentary position of the drum between cells O' and O''. Twice by each drum revolution, a cossettes portion is raised and thus is separated from the heating liquid by the raising screen 13' to then fall in the first cell N', N'' while being guided by the corresponding channel 14 and the solid central part of the axial wall 13. It is noted that during an interval of the drum revolution which corresponds to the raising of a cossette portion by the raising portion 13' of one supply cell, the mixture of beet roots and heating liquid falls in large-width portion L2 of the other supply cell. This aids the spreading of the mixture liquid-cossettes and using the largest area of the drum length 8 which is pervious to the outflow of the heating liquid. Consequently, when the cossettes-liquid portion under consideration lies in the smaller-width zone L1 of the supply compartment i.e. when it begins to be raised, the liquid is discharged for the most part, which aids lowering the weight of materials to be raised. The danger of damaging the beet roots and of plugging the supply compartment raising screens is thus reduced.

The baffles 15 avoid the gathering of beet roots in the dead angle areas of the supply compartment and direct the entering mixture of beet roots and heating juice towards the larger zone of the supply cells as soon as the raising portion 13' of one of said supply cells has run past the drum bottom zone.

As regards discharge of the loaded with sugar extracting liquid, which enters the last compartment for the liquid, i.e. the first cells for the solids N', N'', such liquid essentially flows out through the liquid-pervious part of the casing length 8 which extends in that zone of the first cells N', N'' of each cell series that contains the raising screen 6' for this cell. This disposition avoids overloading the supply compartment with the extracting liquid.

The working explained herein above results clearly from FIGS. 3 to 5. At the moment shown on the FIGS., cossettes fall into the supply cell O' along arrow 29 into the large width part 22 thereof, before the raising parts 13' and 6' which raise cossettes of supply cell O'' and of the first cell for solids N''. At this precise moment, the raising part 13' of the supply cell O'' begins to raise along arrow 30 the cossettes which have fallen into said cell O' during the preceding 180° of the rotation of the apparatus; that raising action after a 180° rotation of the apparatus in relation to what is shown on the FIGS. will conduct to falling of the cossettes into the first cell N'' for solids of that series as shown by arrow 31. Furthermore, the moment shown in FIGS. 3 to 5 corresponds to the final moment when cossettes raised by the raising portion 13 of the supply cell O' fall into the first cell N' of the series of cells I' . . . N' as shown by arrow 32.

It must be understood that the invention is in no way limited to the above embodiments and that many changes can be brought therein without departing from the scope of the invention as defined by the appended claims.

For instance the invention can also be applied to extracting apparatus that comprise but one screw conveyor or more than two screw conveyors. In such a case and when the drum is also divided into two cell series by an axial wall arrangement of the type described, the supply compartment will have a construction similar to the construction described but there will result therefrom that the width of a supply cell can be different from the width of the other supply cell and the same will consequently be true for the slanting of the channels of the two cells.

I claim:

1. In an apparatus for extracting materials from solids by contacting the solids with counterflowing liquid, having:

a revolving drum housing means, a pair of impervious to liquid wall means being mounted in said revolving drum housing means and being integral therewith, which wall means define windings of two staggered helical screws said staggered helical screws defining two screw conveyors for conveying liquid into two separate flows along one axial direction of the drum housing means, there being a first winding and a last winding for each of said helical screws which define respectively a screw sonveyors inlet end and outlet end for the liquid, central axial partition walls extending between the screws succeeding windings and being integral with said drum housing means to separate said windings into half portions of windings and to define two series of cells for solids, each cell being defined between a partition wall, said drum housing means and succeding half portions of windings, said axial partition walls being pervious to the liquid at peripheral portions thereof which extend from said housing means up to a distance from the drum housing means axis so that for each partition wall the peripheral portions comprise raising portions for the solids of one cell during revolving of the drum housing means, channel means for interconnection of adjacent cells in each series of cells through openings in said half windings adjacent the central part of said partition walls, to convey solids from said solids raising portions along the central part of the axial partition walls from cell to cell in each series of cells in counteraxial direction in relation to the liquid flows direction, and means for feeding liquid at the inlet side of each of said two screw conveyor:

the improvements comprising a first cell for solids in each series of cells which first cell is defined between the terminal half portion of the last winding of one of said helical screws and the succeeding half portion of the last winding of the second of said helical screws, a supply compartment for solids, which supply compartment comprises a circular housing means being in axial extension of said drum housing means beyond said first cells for solids, said extension having a substantially equal diameter to that of said drum housing means, which circular housing means being pervious to the liquid, a terminal diametral wall provided with a central inlet opening for the solid being attached to said circular housing means at a distance from each screw conveyor last winding, a supply compartment axial partition wall being mounted in said supply compartment in extension of the partition wall defining the first cell for the solids of each series of cells, said supply compartment partition wall stopping at a distance from said central inlet opening in said diametral wall, said supply axial partition having its peripheral portions pervious to the liquid and being each one in extension of the partition wall raising portion of one series of cells first cell, said supply compartment axial partition wall dividing said supply compartment into two cupply cells, each one having along the generatrix corresponding to the raising part of the supply compartment partition wall of said cell, a width (L1) equal to said raising part of the partition wall and along the generatrix corresponding to the raising part of the partition wall of the second supply cell, a width (L2) corresponding to the sum of said raising part and of the raising part of the adjacent to said second supply cell first cell, channel means being provided between said diametral terminal wall and said last screw conveyors half windings to convey the solids raised by the raising portion of the partition wall of each supply cell into the first cell for solids of each series of cells, and said drum housing means comprises a portion which is pervious to the liquid, said pervious portion being situated in the extension of said circular housing means defining said supply compartment, said pervious portion of the drum housing means and said pervious circular housing means defining a cylindrical pervious housing means which extend from said terminal diametral wall on a distance corresponding to the sum of the width of one raising part of the partition wall of the supply compartment and to the width of the partition wall raising part of one of the adjacent to said supply cell first cells.

2. An apparatus as claimed in claim 1 in which between the top of each central channel located in the supply compartment, when considering said channel by the fall of the solid materials, and the portion facing the supply opening in the terminal wall, is arranged a baffle element for the solid material bounding said supply opening.

3. An apparatus as claimed in claim 1 in which the terminal diametral wall is located when considering the zone where lies the solid material raising element of the first cell from each cell series, at a distance from the last half winding of the screw conveyor which is in the range of the width of a conveyor cell.

4. An apparatus as claimed in claim 1 in which the supply compartment terminal wall is pervious to the liquid between the drum circumference and a distance from the supply opening and in which a fixed ring liquid header surrounds said cylindrical pervious housing means part of the apparatus as at least that portion which is pervious to the liquid of the terminal wall.

* * * * *